(12) United States Patent
Lee et al.

(10) Patent No.: US 10,265,929 B2
(45) Date of Patent: Apr. 23, 2019

(54) CUSHION FLOORING MATERIAL AND MANUFACTURING METHOD FOR THE SAME

(71) Applicant: LG HAUSYS, LTD., Seoul (KR)

(72) Inventors: Seokbong Lee, Suwon-si (KR); Seung Baik Nam, Cheongju-si (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 15/509,776

(22) PCT Filed: Aug. 31, 2015

(86) PCT No.: PCT/KR2015/009158
§ 371 (c)(1),
(2) Date: Mar. 8, 2017

(87) PCT Pub. No.: WO2016/043453
PCT Pub. Date: Mar. 24, 2016

(65) Prior Publication Data
US 2017/0282493 A1 Oct. 5, 2017

(30) Foreign Application Priority Data

Sep. 19, 2014 (KR) .................. 10-2014-0125294

(51) Int. Cl.
*B32B 5/18* (2006.01)
*E04F 15/10* (2006.01)
(Continued)

(52) U.S. Cl.
CPC .................. *B32B 5/18* (2013.01); *B32B 5/10* (2013.01); *B32B 17/1055* (2013.01);
(Continued)

(58) Field of Classification Search
CPC .. B32B 5/18; B32B 5/10; B32B 27/36; Y10T 428/249933; Y10T 428/24994; Y10T 428/249946
See application file for complete search history.

(56) References Cited

U.S. PATENT DOCUMENTS

| | | | |
|---|---|---|---|
| 2008/0194743 A1* | 8/2008 | Rotzinger | C08K 5/005 524/111 |
| 2010/0015420 A1 | 1/2010 | Riebel et al. | |
| 2012/0128946 A1* | 5/2012 | Kwon | B32B 5/02 428/195.1 |

(Continued)

FOREIGN PATENT DOCUMENTS

| | | |
|---|---|---|
| CN | 102099186 A | 6/2011 |
| CN | 102470650 A | 5/2012 |

(Continued)

OTHER PUBLICATIONS

Kang: "China's Bio-material Industry Developing", Technology of Biological Industry (5th ed.), Sep. 2009, pp. 43-53.

*Primary Examiner* — Betelhem Shewareged
(74) *Attorney, Agent, or Firm* — Dentons US LLP (57) ABSTRACT

The present invention relates to a cushion flooring material and a manufacturing method for the same and, more particularly, to a cushion flooring material and a manufacturing method for the same, which uses an elastic layer including a PHA resin alone or a composite resin including a PHA resin as a surface layer constituting the cushion flooring material to prevent toxic substances exposed to the user even if the surface layer is exposed due to wear of a surface treatment layer positioned on the surface layer, thereby making the cushion flooring material non-toxic, eco-friendly and excellent in sound insulation.

13 Claims, 5 Drawing Sheets

(51) Int. Cl.
*E04F 15/20* (2006.01)
*B32B 5/10* (2006.01)
*B32B 17/10* (2006.01)
*B32B 27/36* (2006.01)
*B32B 37/24* (2006.01)

(52) U.S. Cl.
CPC .............. *B32B 27/36* (2013.01); *B32B 37/24* (2013.01); *E04F 15/105* (2013.01); *E04F 15/107* (2013.01); *E04F 15/20* (2013.01); *E04F 15/206* (2013.01); *B32B 2260/021* (2013.01); *B32B 2260/046* (2013.01); *B32B 2307/412* (2013.01); *B32B 2307/51* (2013.01); *B32B 2471/00* (2013.01); *Y10T 428/24994* (2015.04); *Y10T 428/249933* (2015.04); *Y10T 428/249946* (2015.04)

(56) References Cited

U.S. PATENT DOCUMENTS

2014/0228449 A1* 8/2014 Wiesbrock .............. A61L 27/18
514/772.1

FOREIGN PATENT DOCUMENTS

| EP | 0411822 A2 | 2/1991 |
|----|----|----|
| JP | 2009-018442 A | 1/2009 |
| JP | 2013-504702 A | 2/2013 |
| KR | 10-2004-0065494 A1 | 7/2004 |
| KR | 10-2011-0052528 A | 5/2011 |
| KR | 10-2011-0103898 A1 | 9/2011 |
| KR | 10-2011-0103898 A1 | 5/2013 |
| WO | 01/49770 A1 | 7/2001 |
| WO | 2006-121147 A1 | 11/2006 |

* cited by examiner

CUSHION FLOORING MATERIAL AND MANUFACTURING METHOD FOR THE SAME

This application is a National Stage Entry of International Application No. PCT/KR2015/009158, filed Aug. 31, 2015, and claims the benefit of and priority to Korean Application No. 10-2014-0125294, filed Sep. 19, 2014, all of which are hereby incorporated by reference in their entirety for all purposes as if fully set forth herein.

TECHNICAL FIELD

The present invention relates to a cushion flooring material and a manufacturing method for the same and, more particularly, to a cushion flooring material and a manufacturing method for the same, which uses an elastic layer including a PEA resin alone or a composite resin including a PHA resin as a surface layer constituting the cushion flooring material to prevent toxic substances exposed to the user even if the surface layer is exposed due to wear of a surface treatment layer positioned on the surface layer, thereby making the cushion flooring material non-toxic, eco-friendly and excellent in sound insulation.

BACKGROUND ART

Recently, there has been a growing interest in the eco-friendly products as well as health care because of the high quality of living. For example, the flooring materials that are in close relation to the living life have the trend towards the materials capable of providing eco-friendliness and sound insulation. Besides, restrictions on the materials used in the manufacture of such flooring materials are increasing these days.

The conventional flooring material as disclosed in Korean Patent Publication No. 10-2004-0065494 is mainly a PVC material. More specifically, the conventional flooring materials have a multi-layered structure including a balance layer, a cushioning layer, a dimension-stabilizing layer, a print layer, a transparent PVC layer, and a surface treatment layer in a bottom-to-top order.

However, the conventional flooring materials, which are dominantly PVC materials, contain a toxic phthalate-based plasticizer to emit harmful substances such as endocrine disrupters and toxic gases (e.g., hydrogen chloride) when burnt during the waste incineration or on fire and remain almost permanently in the nature when disposed in landfill, causing a serious problem to the environment.

Although the flooring material has a surface treatment layer on the top to prevent scratch and contamination, the surface treatment layer becomes worn out in process of time to expose the underlying transparent PVC layer. When in contact with human body, the harmful substances released from the transparent PVC layer made of a PVC material may have an adverse effect on the human body.

In addition, with the noise between floors becoming a serious social problem in recent years, there has been an urgent demand for flooring materials to minimize the noise between floors.

PRIOR DOCUMENTS

Patent Documents (Patent Document 1)
KR 10-2004-0065494 A (laid open on Jul. 22, 2004)

DISCLOSURE OF INVENTION

The present invention is contrived to solve the above-mentioned problems and has an object to provide a cushion flooring material and a method for manufacturing the same, which uses an elastic layer including a PEA resin alone or a composite resin including the PHA resin as a surface layer constituting the cushion flooring material to prevent toxic substances exposed to the user even if the surface layer is exposed due to wear of a surface treatment layer positioned on the surface layer, thereby making the cushion flooring material non-toxic, eco-friendly and excellent, in sound insulation.

Technical Solution

In order to solve the problems, the present invention is to provide a cushion flooring material including a cushioning layer, a print layer and an elastic layer in a sequential order from bottom to top, wherein the elastic layer includes a PHA resin.

Further, the present invention is to provide a cushion flooring material including a cushioning layer, a print layer, and an elastic layer in a sequential order from bottom, to top, wherein the elastic layer includes a composite resin including a PHA resin and an acryl-based elastic resin.

Further, the present invention is to provide a cushion flooring material including a cushioning layer, a print layer, and an elastic layer in a sequential order from bottom to top, wherein the elastic layer includes a composite resin including a PHA resin, an acryl-based elastic resin, and a PLA resin.

Further, the present invention is to provide a cushion flooring material including a cushioning layer, a print layer, and an elastic layer in a sequential order from bottom, to top, wherein the elastic layer includes a composite resin including a PEA resin and a PLA resin.

Further, the present invention is to provide a method for manufacturing a cushion flooring material including: (a) preparing a cushioning layer; (b) foaming the cushioning layer; (c) printing a pattern on the cushioning layer or laminating a film or paper having a printed pattern to the cushioning layer to form a print layer; (d) forming an elastic layer using a composition including a PEA resin; and (e) laminating the foamed cushioning layer, the print layer and the elastic layer together.

Effects of the Invention

The present invention can provide a cushion flooring material and a manufacturing method for the same, which uses an elastic layer including a PEA resin alone or a composite resin including a PHA resin as a surface layer constituting the cushion flooring material to prevent toxic substances exposed to the user even if the surface layer is exposed due to wear of a surface treatment layer positioned on the surface layer, thereby making the cushion flooring material non-toxic and eco-friendly and also providing beautiful appearance and a variety of functions, particularly, sound insulating and cushioning functions to prevent noises between floors.

BEST MODES FOR CARRYING OUT THE INVENTION

Hereinafter, the present invention will be described in detail with reference to the accompanying drawings.

Figure 1:
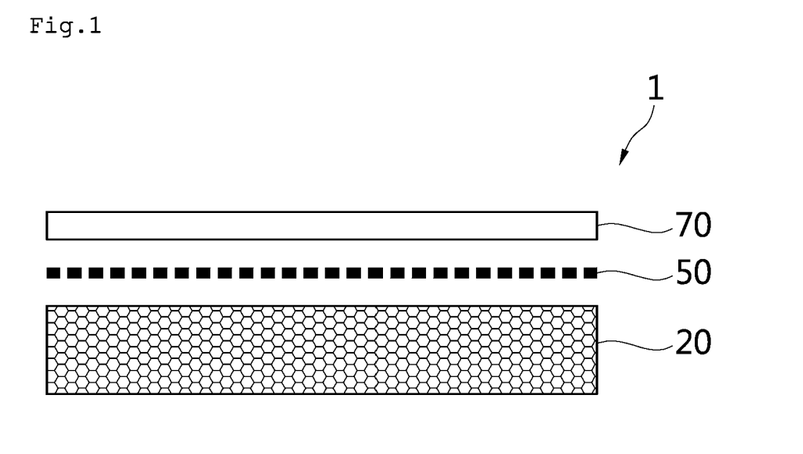
FIG. 1 is a mimetic cross-sectional view showing a first embodiment of the cushion flooring material according to the present invention.

As illustrated in FIG. 1, the cushion flooring material according to a first embodiment of the present invention includes a cushioning layer 20, a print layer 50, and an elastic layer 70 in a sequential order from bottom to top, and the elastic layer 70 includes a PHA resin.

In the present invention, the cushioning layer 20 is formed from a foam, synthetic resin and serves to provide cushion for the flooring material and also adsorb the shock. The cushioning layer 20 also provides more volume for the cushion flooring material.

The cushioning layer 20 may include at least two selected from the group consisting of polyvinyl chloride, a cross-linked acrylonitrile butadiene-vinyl chloride pre-copolymer resin, a modified olefin, resin, a ethylene vinyl acetate (EVA) resin, or a thermoplastic polyurethane (TPU) resin. Preferably, the composition of the cushioning layer 20 includes 1 to 300 parts by weight of the cross-linked acrylonitrile butadiene-vinyl chloride pre-copolymer resin, 0.1 to 200 parts by weight of the modified olefin resin, 5 to 100 parts by weight of the ethylene vinyl acetate (EVA) or thermoplastic polyurethane (TPU) resin, 30 to 85 parts by weight of a plasticizer, 1 to 5 parts by weight of a foam stabilizer, and 2 to 6 parts by weight of a foaming agent, with respect to 100 parts by weight of polyvinyl chloride having a degree of polymerization in the range of 1,000 to 1,700. The cushioning layer 20 formed from such a composition material can be obtained by normal heat treatment, preferably by neat treatment using a foaming oven.

In the present invention, the print layer 50 serves to provide a variety of print patterns on the obtained cushion flooring material. In this regard, the print layer 50 may be formed by applying a print pattern on a target layer through transfer printing, gravure printing, or screen printing, preferably by transfer printing. Optionally, a film, or paper having a printed pattern may be laminated to form, the print layer 50. Such a print layer 50 provides a pattern by the printing process to give an esthetic appearance and a design.

In the present invention, the elastic layer 70, which includes a PHA resin that is eco-friendly and biodegradable, serves to provide elasticity, flexibility and sound insulation as the surface layer of the flooring material and prevents the user from being exposed to toxic substances even if the surface layer is exposed due to wear of the surface treatment layer positioned on the surface layer.

The PHA resin may be a single polymer including a repeating unit of the following chemical formula 1. Preferably, the PHA resin is a copolymer of hard and soft segments, where the hard segment includes a repeating unit of the following chemical formula 1 and the soft segment includes a repeating unit of the following chemical formula 2:

[Chemical Formula 1]

In the chemical formula 1, $R_1$ is hydrogen or a substituted or unsubstituted alkyl group having 1 to 15 carbon atoms; and n is an integer from 1 to 3.

[Chemical Formula 2]

In the chemical formula 2, $R_2$ is hydrogen or a substituted or unsubstituted alkyl group having 1 to 15 carbon atoms; and m is an integer from 1 to 3.

In a polymer including a repeating unit of the chemical formula 1 constituting the hard segment, $R_1$ is hydrogen or a substituted or unsubstituted alkyl group having 1 to 15 carbon atoms; and n is an integer from 1 to 3. Preferably, $R_1$ is an alkyl group having 1 to 9 carbon atoms; and n is an integer of 1 or 2. More preferably, $R_1$ is methyl; and n=1.

In a polymer including a repeating unit of the chemical formula 2 constituting the soft segment, $R_2$ is hydrogen or a substituted or unsubstituted alkyl group having 1 to 15 carbon atoms; and m is an integer from 1 to 3. Preferably, $R_2$ is an alkyl group having 1 to 9 carbon atoms; and m is an integer of 1 or 2. More preferably, $R_2$ is hydrogen or an alkyl group having 1 to 3 carbon atoms; and m is an integer of 1 or 2.

The PHA resin includes 50 to 99 wt % of the hard segment and 1 to 50 wt % of the soft segment. Preferably, the PHA resin includes 50 to 90 wt % of the hard segment and 10 to 50 wt % of the soft segment. More preferably, the PHA resin includes 60 to 90 wt % of the hard segment and 10 to 40 wt % of the soft segment. When the content of the hard segment is above the defined range, the resin become too stiff to process. When the content of the soft segment is above the defined range, the resin becomes extremely soft and leads to deterioration in the viscosity during the processing step and releasability. Accordingly, the hard and soft segments are preferably used in the above-defined range of content.

The elastic layer 70 may further include 1 to 5 parts by weight of a lubricant with respect to 100 parts by weight of the PHA resin. The lubricant is applicable to the manufacture of flooring materials and thus includes a hydrocarbon-based wax or a known higher fatty acid commercially available.

As the elastic layer 70 includes such a PHA resin, the cushion flooring material of the present invention using the elastic layer 70 can display excellences in eco-friendliness, elasticity, flexibility and sound insulation and provide soft touch.

Figure 2:
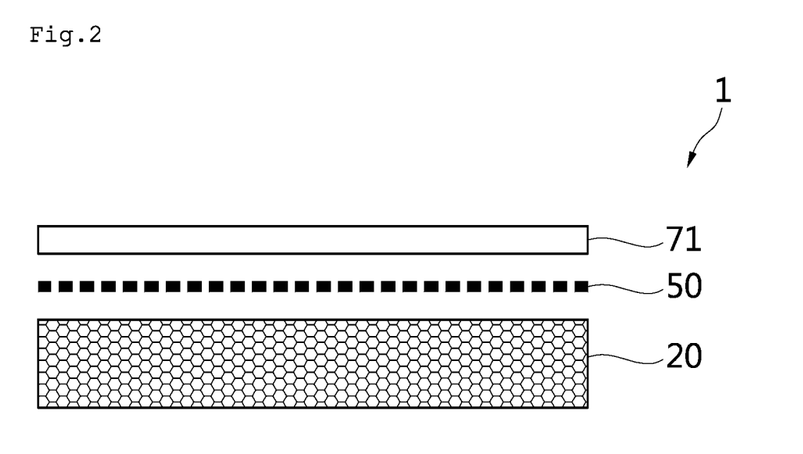
FIG. 2 is a mimetic cross-sectional view showing a second embodiment of the cushion flooring material according to the present invention.

As illustrated in FIG. 2, the cushion flooring material according to a second embodiment of the present, invention includes a cushioning layer 20, a print layer 50, and an elastic layer 71 in a sequential order from bottom to top, and the elastic layer 71 is formed, from, a composite resin including an acryl-based elastic resin in addition to a PHA resin. In other words, the elastic layer 71 may include 10 to 90 wt % of the PHA resin and 10 to 90 wt % of the acryl-based elastic resin.

The acryl-based elastic resin may be a copolymer of a polymer of an alkylmethacrylate monomer constituting the hard segment and a polymer of an alkylacrylate monomer constituting the soft segment. In this regard, the copolymer may be a core-shell copolymer or a block copolymer.

The core-shell copolymer has a coupling structure that includes the soft segment as a core and the hard segment as a shell surrounding the core.

The preparation method for the core-shell copolymer includes preparing a core including the soft segment and then preparing a shell including the hard segment and surrounding the core. The core and the shell may be fabricated by emulsion polymerization or suspension polymerization, preferably by suspension polymerization that makes the isolation or processing of the polymer easier.

In addition, the block copolymer is composed of a soft segment and a hard segment. Preferably, the block copolymer is a tri-block copolymer having soft and hard segments at either end, in the aspect that it can enhance cold shock resistance, thermal resistance, etc. The preparation method of the block copolymer involves the living polymerization method using monomers constituting the individual blocks. Examples of the living polymerization method include an anionic polymerization method using an organic alkali metal compound as a polymerization initiator in the presence of a mineral salt such as the salt of an alkali metal or an alkali earth metal; an anionic polymerization method using an organic alkali metal compound as a polymerization initiator in the presence of an organic aluminum compound; a polymerization method using an organic rare earth metal complex as a polymerization initiator; or a radical polymerization method using an alpha-halogenated ester compound as a polymerization initiator in the presence of a copper compound. Another method of preparing the block copolymer may involve polymerizing monomers constituting the individual blocks in the presence of a polyradical polymerization initiator or a polyradical chain-transfer agent to prepare a mixture containing a block copolymer. Preferably, the block copolymer is prepared by the anionic polymerization method using an organic alkali metal compound as a polymerization initiator in the presence of an organic aluminum compound, which method yields the block copolymer with high purity and uses materials having a narrow molecular weight distribution, that is, including neither oligomers causing deterioration of shock resistance and thermal resistance nor high-molecular materials causing deterioration of fluidity. Examples of the organic aluminum compound as used herein may include isobutyl bis(2,6-di-t-butyl-4-methylphenoxy) aluminum, isobutyl bis(2,6-di-t-butylphenoxy) aluminum, isobutyl bis-2,2-methylene bis(4-methyl-6-t-butylphenoxy) aluminum, n-octyl bis(2,6-di-t-butyl-4-methylphenoxy) aluminum, n-octyl bis(2,6-di-t-butylphenoxy) aluminum, n-octyl bis-2,2-methylene bis(4-methyl-6-t-butylphenoxy) aluminum, tris(2,6-di-t-butyl-4-methylphenoxy) aluminum, tris(2,6-diphenylphenoxy) aluminum, etc. Among these organic aluminum compounds, isobutyl bis(2,6-di-t-butyl-4-methylphenoxy) aluminum, isobutyl bis(2,4-di-t-butylphenoxy) aluminum, n-octyl bis (2,6-di-t-butyl-4-methylphenoxy) aluminum, or n-octyl bis (2,4-di-t-butylphenoxy) aluminum is particularly preferred in the aspect of polymerization activity, block efficiency, or the like.

In this regard, the copolymer may have a mixing ratio of the hard segment to the soft segment in the range of 20 to 40 wt %: 80 to 60 wt %, preferably 25 to 35 wt %: 75 to 65 wt % in the aspect, that it is possible to provide elasticity and mechanical properties, particularly wear resistance, suitable for use purpose as a base material for the flooring material.

Preferably, the hard segment has a glass transition temperature in the range of 80 to 120 UC, and the soft segment has a glass transition temperature in the range of −60 to −20° C.

The alkylmethacrylate monomer constituting the hard segment may include at least one selected from the group consisting of methylmethacrylate, ethylmethacrylate, n-propylmethacrylate, i-propylmethacrylate, n-butylmethacrylate, t-butylmethacrylate, pentylmethacrylate, hexylmethacrylate, 2-ethylhexylmethacrylate, heptylmethacrylate, octylmethacrylate, cyclopentylmethacrylate, 3-vinylcyclohexylmethacrylate, and cyclohexylmethacrylate. Preferably, the alkylmethacrylate monomer constituting the hard segment is methylmethacrylate.

The alkylacrylate monomer constituting the soft segment may include at least one selected from the group consisting of methylacrylate, ethylacrylate, n-propylacrylate, i-propylacrylate, n-butylacrylate, t-butylacrylate, pentylacrylate, hexylacrylate, 2-ethylhexylacrylate, heptylacrylate, octylacrylate, cyclopentylacrylate, 3-vinylcyclohexylacrylate, and cyclohexylacrylate. Preferably, the alkylacrylate monomer is n-butylacrylate.

The acryl-based elastic resin contains neither low-molecular substances such as the remaining monomers, oligomers, etc. nor a plasticizer. The acryl-based elastic resin features a low melt viscosity leading to nigh fluidity and displays good weather resistance and low solution viscosity that results in just a low emission of volatile organic compounds. Also, the acryl-based elastic resin has such a good compatibility and adhesiveness as to provide high adhesion when optionally having an underlying synthetic layer such as PVC.

The elastic layer 71 used in the present invention is formed from, a composite resin that includes 10 to 90 wt % of the PI-IA resin and 10 to 90 wt % of the acryl-based elastic resin, preferably 30 to 70 wt % of the PHA resin and 30 to 70 wt % of the acryl-based elastic resin.

When the content of the acryl-based elastic resin is less than the above-defined range, the fluidity of the film deteriorates in a undesirable manner. The content of the PHA resin less than the defined range causes deterioration in the biodegradability, and the content of the PHA resin greater than the defined range possibly leads to undesirable deterioration in the properties clue to pyrolysis during the processing. More specifically, the proper temperature for the extrusion and calendering process is 160 to 180° C. for the acryl-based elastic resin and 120 to 140° C. for the PHA resin. In the case of using a mixture of the acryl-based elastic resin and the PHA resin, the content of the acryl-based elastic resin greater than the defined range results in deterioration in the biodegradability of the elastic layer because the relatively low content of the PHA resin, while the content of the acryl-based elastic resin less than the defined range possibly leads to a relatively high content of the PHA resin and thus possibly deteriorates the properties due to pyrolysis of the PHA resin during the extrusion or calendering process. It is therefore desirable to use the acryl-based elastic resin and the PHA resin in the above-defined content range.

The elastic layer 71 may further include 1 to 5 parts by weight of a lubricant with respect to 100 parts by weight of the total mixture of the PHA resin and the acryl-based elastic resin. The lubricant is applicable to the manufacture of flooring materials and thus includes a hydrocarbon-based wax or a known higher fatty acid commercially available.

As the elastic layer 71 includes such a composite resin including the PEA resin and the acryl-based elastic resin, the cushion flooring material of the present invention using the elastic layer 71 can display excellences in eco-friendliness, elasticity, flexibility and sound insulation and provide soft touch.

Figure 3:
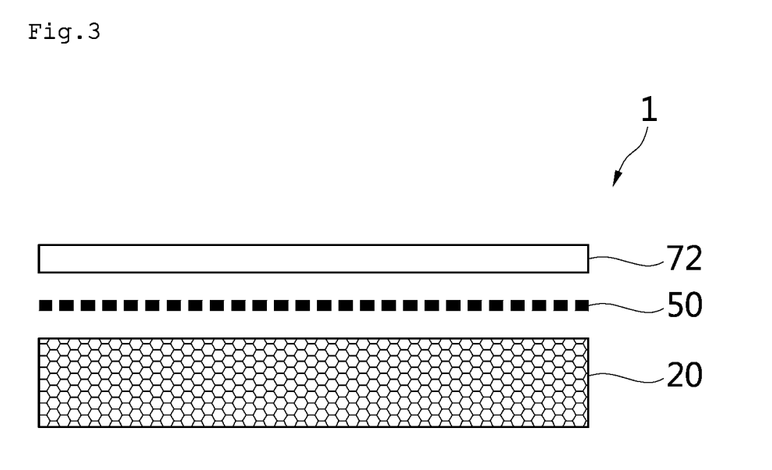
FIG. 3 is a mimetic cross-sectional view showing a third embodiment of the cushion flooring material according to the present invention.

As illustrated in FIG. 3, the cushion flooring material according to a third embodiment of the present invention includes a cushioning layer 20, a print layer 50, and an elastic layer 72 in a sequential order from bottom to top, and the elastic layer 72 is formed from, a composite resin including an acryl-based elastic resin and a PLA resin in addition to the PHA resin.

In other words, the elastic layer 72 may include a composite resin of the PHA resin, the acryl-based elastic resin and the PLA resin. More specifically, the elastic layer 72 may include 10 to 50 wt % of the PHA resin, 20 to 80 wt % of the acryl-based elastic resin and 10 to 50 wt % of the PLA resin; preferably 10 to 30 wt % of the PHA resin, 30 to 60 wt % of the acryl-based elastic resin and 10 to 40 wt % of the PLA resin.

In the case of the elastic layer including the PLA resin alone, there may occur some problems as follows.

Firstly, the PLA resin has poor dimension stability and is susceptible to deformation such as contraction and distortion, so the flooring material including the PLA resin can have inadequately poor properties.

Secondly, the PLA resin tends to cause "blocking" under high-temperature conditions as in the summer season, so the rolled film can stick to itself and become entangled. Thus the use of the PLA resin in the production of flooring materials can lead to deterioration in the productivity.

Thirdly, the PLA resin features low processability due to its narrow processing temperature range (130 to 150° C.) and thus its use in the production of flooring materials can deteriorate the productivity.

Finally, the PLA resin has a narrow use temperature range (20 to 35° C.) and is therefore hard to use for the flooring materials. The use temperature out of the defined range, that is, below 20° C. results in the PLA resin excessively hard and easily broken in the winter season; and the use temperature above 35° C. causes the PLA resin to lose elasticity and become excessively soft, eventually deteriorating the properties required to the flooring materials and leading to loss of functions peculiar to the flooring materials.

Accordingly, the elastic layer 72 used in the present invention is formed from a composite resin including 10 to 50 wt % of the PEA resin, 20 to 80 wt % of the acryl-based elastic resin and 10 to 50 wt % of the PLA resin, so it features elasticity, flexibility and sound insulation, in comparison with the elastic layer using the PLA resin alone. It is therefore possible to obtain an elastic layer excellent in elasticity, flexibility and sound insulation and particularly available in the manufacture of flooring materials within the defined content ranges.

The content, of the PLA resin greater than the defined, range is undesirable in that the lack of flexibility as characteristic to the material possibly makes the product using the PLA resin easily broken, by bending. In addition, the content of the acryl-based elastic resin less than the defined range causes deterioration in the flexibility of the elastic layer. The content of the PHA resin less than the defined range leads to the lack of flexibility in the elastic layer and deterioration in the biodegradability of the elastic layer. Further, the content of the PHA resin greater than the defined range also undesirably causes deterioration in the properties of the elastic layer through pyrolysis during the extrusion or calendering process.

As the elastic layer 72 includes such a composite resin including the PHA resin, the acryl-based elastic resin and the PLA resin, the cushion flooring material of the present invention using the elastic layer 72 can display excellences in eco-friendliness, elasticity, flexibility and sound insulation and provide soft touch.

Figure 4:
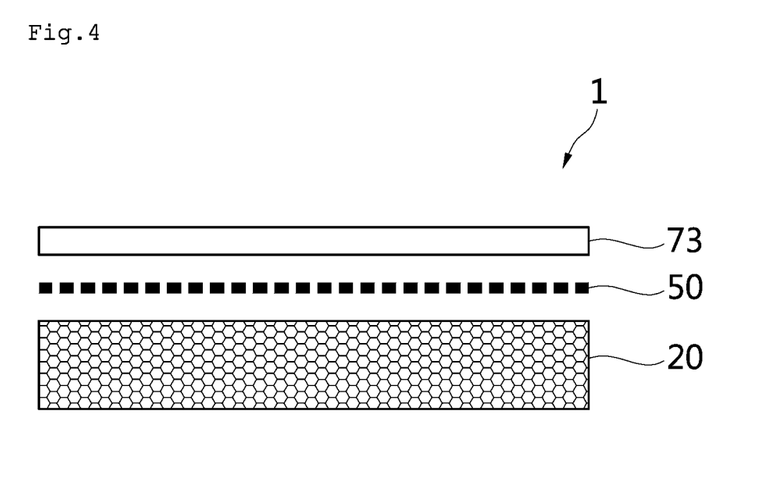
FIG. 4 is a mimetic cross-sectional view showing a fourth embodiment of the cushion flooring material according to the present invention.

As illustrated in FIG. 4, the cushion flooring material according to a fourth embodiment of the present invention includes a cushioning layer 20, a print layer 50, and an elastic layer 73 in a sequential order from bottom to top, and the elastic layer 73 is formed from a composite resin including a PLA resin in addition to the PHA resin.

The cushion flooring material according to the fourth embodiment of the present invention is the same as that according to the third embodiment of the present invention, excepting that an acryl-based elastic resin is not included. Hence, the repetitive description will be omitted. As the use of the PLA resin alone brings about such problems as already described above, the elastic layer 73 used in the present invention may include 10 to 90 wt % of the PHA resin and 10 to 90 wt % of the PLA resin. Preferably, the elastic layer 73 is formed from a composite resin including 40 to 70 wt % of the PHA resin and 30 to 60 wt % of the PLA resin.

The content of the PLA resin greater than the defined range is undesirable in that the lack of flexibility as characteristic to the material possibly makes the product using the PLA resin easily broken by bending. In addition, the content of the PHA resin less than the defined range leads to the lack of flexibility in the elastic layer. Further, the content of the PHA resin greater than the defined range is undesirable because it possibly causes deterioration in the properties of the elastic layer through pyrolysis during the extrusion or calendering process.

The elastic layers 70, 71, 72 and 73 according to the first to fourth embodiments of the present invention may be fabricated through calendering molding, cast molding, blow molding, extrusion molding, etc. The calendering molding is a molding method by which a material is pressed between at least two rollers rotating in the opposite direction to each other to continuously make sheets or films. The cast molding is a molding method that includes applying multiple coatings of a synthetic resin sol to a release paper good in thermal resistance and easily releasable and then performing lamination. The blow molding is a molding method that, begins with melting down the thermoplastic resin by heat, inserting it into a mold with at least one or two tube-like parisons, the top and bottoms ends of which are then closed, and blowing air into the parisons through a mandrel to expand the resin, pressing the parisons closely against the inner wall of the mold to make a hollow container product. The extrusion molding is a molding method that uses an extruder to melt down a thermoplastic material by heat on the surface of a substrate and then form it into a film in a T-shaped die through extrusion and continuous compression at the same time.

Preferably, the manufacture of flooring materials uses the calendering molding process, which allows it to freely control the contents of the ingredients such as additives or the like relative to other manufacturing methods, thereby providing flooring materials with excellences in terms of flexibility, shock resistance, mechanical strengths, processability, easiness to construct, and melt efficiency, and also reduces the cost of materials.

Preferably, the elastic layer 70, 71, 72 or 73 is transparent. Using such a transparent elastic layer advantageously makes it possible to provide a flooring material with aesthetic impression due to the presence of the underlying print layer 50 or the like. Further, the elastic layer 70, 71, 72 or 73 serves to provide durability for the cushion flooring material of the present invention and protect the underlying print layer 50.

The cushion flooring materials according to the first to fourth embodiments of the present invention may further include, as an option, a surface treatment layer 80 as the uppermost layer.

In other words, the surface treatment layer 80 may be formed on the top of the elastic layer 70, 71, 72 or 73 to prevent the initial contamination, that is, keeping contaminants from attaching to the cushion flooring material, and enhance scratch resistance and wear resistance. The surface treatment layer 80 is generally formed by applying a coating solution containing a thermosetting or photocurable compound dissolved in a solvent. It is preferable to use a photocurable compound because a thermosetting compound can change the properties of other underlying layers, particularly, the elastic layer by the heat applied to form the surface treatment layer. In this regard, the curable compounds as used herein may be a monomer or oligomer having at least one functional group such as an unsaturated bonding group, etc. Examples of the curable compounds may include urethane acrylate, epoxy acrylate, polyether acrylate, polyester acrylate, dipentaacrythritol hexaacrylate, dipentaacrythritol pentaacrylate, pentaacrythiotol tetraacrylate, dipentaerythritol hexaacrylate, dipentaerythritol pentaacrylate, etc., which are listed as examples only and not given to limit the scope of the present invention. The present invention may use one or at least two of these curable compounds as the photocurable compound. The coating liquid including the photocurable compound generally includes a photopolymerization initiator in addition to the photocurable compound and the solvent. If necessary, the coating liquid may further include a variety of additives such as a photo-stabilizer, a leveling agent, etc. as long as no change in the properties of the coating layer occurs due to the presence of the additives. The surface treatment layer has a surface hardness of 7H or higher, desirably controlled in the range of 7H to 8H, as measured according to the pencil scratch hardness test. Preferably, the photocurable compound constituting the surface treatment layer may be photocurable urethane acrylate generally available.

The cushion flooring materials according to the first to fourth embodiments of the present invention may further include, as an option, a transparent layer 60 between the print layer 50 and the elastic layer 70, 71, 72 or 73.

The transparent layer 60 may be a film formed from any one selected from the group consisting of polyvinyl chloride (PVC), polyethylene terephthalate (PET), polybutylene terephthalate (PBT), polypropylene (PP), polyethylene (PE), polymethyl methacrylate (PMMA), acrylonitrile-butadiene-styrene (ABS), polycarbonate (PC), and styrene-acrylonitrile (SAN) copolymer. Preferably, the transparent layer 60 uses a clear polyvinyl chloride film or a clear polyethylene terephthalate film, which features high transparency.

The transparent layer 60 may be applied in combination with the elastic layer 70, 71, 72 or 73 to reduce the thickness of the elastic layer 70, 71, 72 or 73. This can lower the use amount of the acryl-based elastic resin, PHA resin or PLA resin that is expensive relative to the material of the transparent layer 60, that is, PVC or PET, contributing to the cost reduction, and thereby reduce the production cost relative to the case of forming the elastic layer as the whole of the transparent layer on the print layer, but providing the same or similar functions and appearance.

The cushion flooring materials according to the first to fourth embodiments of the present invention may further include, as an option, a dimension-stabilizing layer 40 between the cushioning layer 20 and the print layer 50.

The dimension-stabilizing layer 40 serves to reinforce the dimension stabilization of the cushion flooring material.

The dimension-stabilizing layer 40 is formed from glass fiber impregnated with PVC sol, preferably an unwoven fabric impregnated with glass fiber. In this case, it can be understood that the impregnation with PVC sol not only immobilizes the glass fiber but also facilitate the lamination of the dimension-stabilizing layer with the print layer or the cushioning layer. Preferably, the PVC sol may include 100 parts by weight of polyvinyl chloride having a degree of polymerization in the range of 1,200 to 1,700, 50 to 100 parts by weight of dioctyl terephthalate (DOTP) or dioctyl phthalate (DOP) as a plasticizer, 1 to 3 parts by weight of epoxidized soybean oil, 2 to 6 parts by weight of a barium-zinc heat stabilizer, 10 to 80 parts by weight of calcium carbonate, and 5 to 50 parts by weight of titanium dioxide as a white pigment.

The cushion flooring materials according to the first to fourth embodiments of the present invention may further include, as an option, a colored layer 51 between the dimension-stabilizing layer 40 and the print layer 50. Optionally, it is also possible to form the colored layer 51 instead of the print layer 50 on the dimension-stabilizing layer 40.

The colored layer 51 assists the print layer 50 to form the background color of the pattern printed on the print layer 50. When the print layer 50 does not exist, the colored layer 51 helps the elastic layer 70, 71, 72 or 73 to form the background color.

The colored layer 51 may include polyvinyl chloride and a filler (i.e., calcium carbonate) with the same composition of the cushioning layer 20, excepting that it does not foam. Preferably, the colored layer 51 includes, with respect to 100 parts by weight of polyvinyl chloride having a degree of polymerization in the range of 1,000 to 1,700, 30 to 100 parts by weight of dioctyl terephthalate (DOTP) or dioctyl phthalate (DOP) as a plasticizer, 1 to 3 parts by weight of epoxidized soybean oil (E.S.O), 2 to 6 parts by weight of a barium-zinc heat stabilizer, 1 to 150 parts by weight of calcium carbonate, and 1 to 20 parts by weight of a pigment. The colored layer 51 may be formed through calendering molding, cast molding, and so forth.

The cushion flooring materials according to the first to fourth embodiments of the present invention may further include, as an option, a lining layer 30 between the cushioning layer 20 and the dimension-stabilizing layer 40.

The lining layer 30 serves to promote adhesion between the dimension-stabilizing layer 40 and the cushioning layer 20. Preferably, the lining layer 30 includes, with respect to 100 parts by weight of polyvinyl chloride having a degree of polymerization in the range of 1,000 to 1,700, 30 to 85 parts by weight of dioctyl terephthalate (DOTP) or dioctyl phthalate (DOP) as a plasticizer, 1 to 3 parts by weight of epoxidized soybean oil (E.S.O), 1 to 80 parts by weight of calcium carbonate, and 2 to 6 parts by weight of a barium-zinc heat stabilizer. The lining layer 30 may be formed through calendering molding, cast molding, and so forth.

The cushion flooring materials according to the first to fourth embodiments of the present invention may further include, as an option, a balance layer 10 as the lowermost layer.

The balance layer 10 serves to maintain the entire curling balance of the top and bottom, parts of the flooring material. The balance layer 10 may include polyvinyl chloride and a filler (i.e., calcium carbonate) with the same composition of the cushioning layer 20, excepting that, it does not foam. Therefore, the present invention is specifically limited. Preferably, the balance layer 10 includes, with respect to 100 parts by weight of polyvinyl chloride having a degree of polymerization in the range of 1,000 to 1,700, 30 to 100 parts by weight of dioctyl terephthalate (DOTP) or dioctyl phthalate (DOP) as a plasticizer, 1 to 3 parts by weight of epoxidized soybean oil (E.S.O), 2 to 6 parts by weight of a barium-zinc heat stabilizer, 1 to 150 parts by weight of calcium carbonate. The balance layer 10 may be formed, through, calendering molding, cast molding, or the like.

The cushion flooring materials according to the first to fourth embodiments of the present invention may further include, as an option, an additional function layer 11 as the lowermost layer.

The additional function layer 11 may be woven fabric, knitted fabric, or non-woven fabric commonly available. The woven fabric, knitted fabric, or non-woven fabric may be woven or knitted fabric made of natural fiber, synthetic fiber, or blended yarn prepared by blended spinning of the natural and synthetic fibers, or non-woven fabric prepared by a known processing method such as needle punching. The additional function layer 11 serves to make the appearance of the cushion flooring material, particularly the hidden side (i.e., bottom side) of the cushion flooring material easier on the eye, thereby supporting high-quality of the products and enhancing the market value of the products, and also to enhance the close contact of the cushion flooring material with the floor, making the installation of the flooring material easier.

Hereinafter, a description will be given as to the specific embodiments of the present invention that further include at least one of the optional components, that is, surface treatment layer 80, transparent layer 60, dimension-stabilizing layer 40, colored layer 51, lining layer 30, balance layer 10, and additional function layer 11, in addition to the components of the first to fourth embodiments of the present invention.

Figure 5:
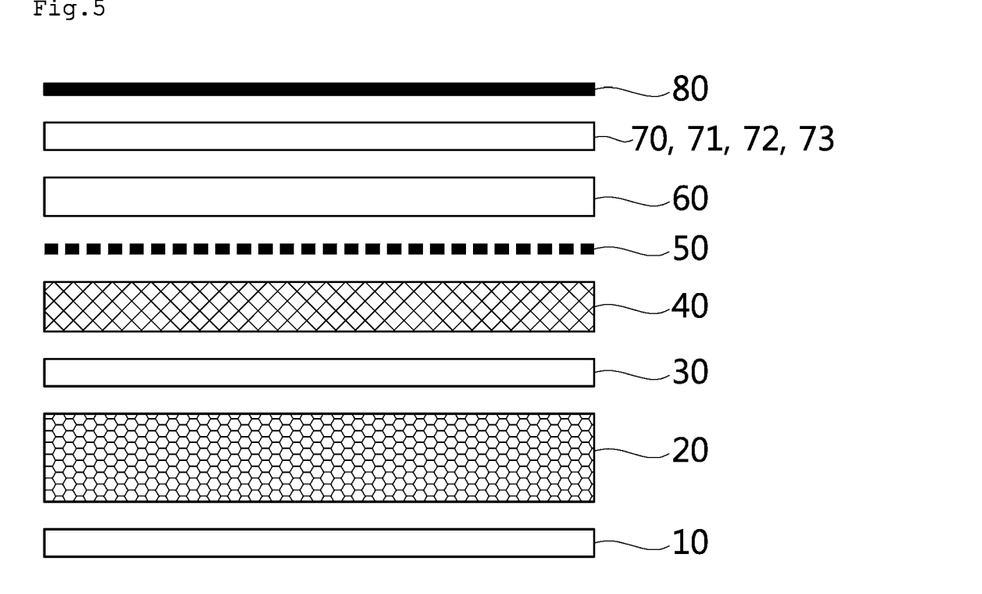
FIG. 5 is a mimetic cross-sectional view showing a fifth embodiment of the cushion flooring material according to the present invention.

FIG. 5 is an illustration showing a fifth embodiment of the cushion flooring material of the present invention, which has a laminated structure of a balance layer 10, a cushioning layer 20, a lining layer 30, a dimension-stabilizing layer 40, a print layer 50, a transparent layer 60, an elastic layer 70, 71, 72 or 73, and a surface treatment layer 80 in a sequential order from bottom to top.

As for the cushion flooring material having such a layered structure, the layer thickness is preferably in the range of 0.1 to 0.2 mm for the balance layer 10; 0.3 to 3.0 mm (thickness before foaming) for the cushioning layer 20; 0.05 to 0.60 mm for the lining layer 30; 0.32 to 0.38 mm for the dimension-stabilizing layer 40; 0.1 to 0.7 mm for the transparent layer 60; 0.1 to 0.2 mm for the elastic layer 70, 71, 72 or 73; and 20 to 40 μm the surface treatment layer 80. Further, the cushion flooring material composed of these layers can be adjusted to have the total thickness of about 4.5 mm.

Preferably, the print layer 50 is an ink layer formed on the dimension-stabilizing layer 40 through the transfer printing process too thin to measure its thickness, so the thickness of the print layer 50 is ignorable actually with no significant effect on the total thickness of the cushion flooring material. Optionally, the print layer 50 may be a film or paper with a print pattern.

In the above construction, the balance layer 10 and the transparent layer 60 can be omitted. But, when the transparent layer 60 is not used, it is preferable to have the elastic layer 70, 71, 72 or 73 thicker, in which case the thickness of the elastic layer 70, 71, 72 or 73 is in the range of 0.2 to 1.0 mm.

Figure 6:
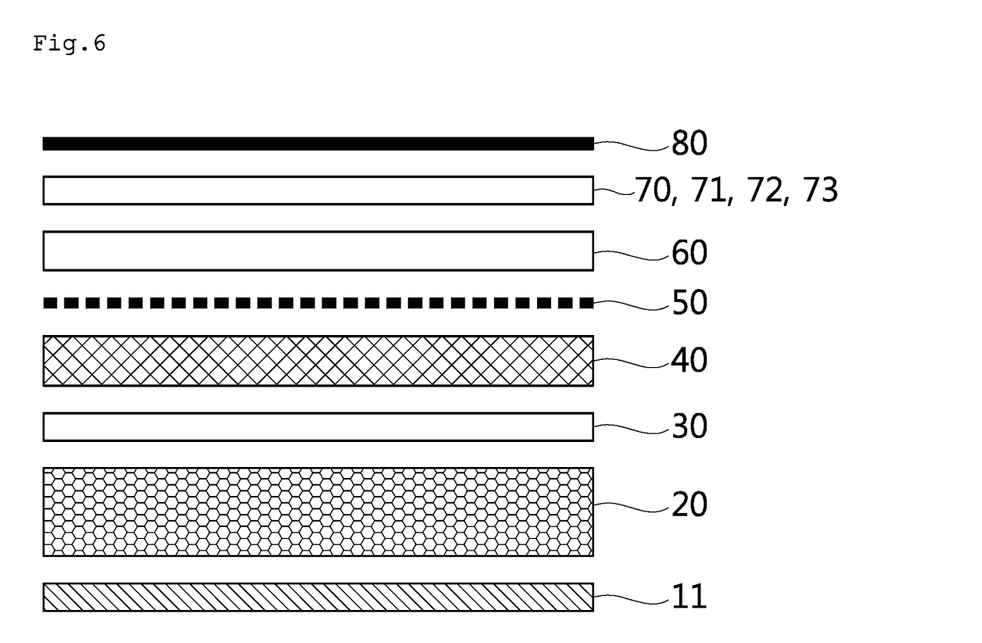
FIG. 6 is a mimetic cross-sectional view showing a sixth embodiment of the cushion flooring material according to the present invention.

FIG. 6 is an illustration showing a sixth embodiment of the cushion flooring material of the present invention, which has a laminated structure of an additional function layer 11, a cushioning layer 20, a lining layer 30, a dimension-stabilizing layer 40, a print layer 50, a transparent layer 60, an elastic layer 70, 71, 72 or 73, and a surface treatment layer 80 in a sequential order from bottom to top. The cushion flooring material of FIG. 6 is the same as the cushion flooring material of FIG. 5 according to the fifth embodiment of the present invention, excepting that, the additional function, layer 11 is used in place of the balance layer 10.

As for the cushion flooring material having such a layered structure, the layer thickness is preferably in the range of 0.1 to 0.2 mm for the additional function layer 11; 0.3 to 3.0 mm (thickness before foaming) for the cushioning layer 20; 0.05 to 0.60 mm for the lining layer 30; 0.32 to 0.38 mm for the dimension-stabilizing layer 40; 0.1 to 0.7 mm for the transparent layer 60; 0.1 to 0.2 mm for the elastic layer 70, 71, 72 or 73; and 20 to 40 μm for the surface treatment layer 80.

In the above construction, the additional function layer 11 and the transparent layer 60 can be omitted. But, when the transparent layer 60 is not used, it is preferable to have the elastic layer 70, 71, 72 or 73 thicker, in which case the thickness of the elastic layer 70, 71, 72 or 73 is in the range of 0.2 to 1.0 mm.

Figure 7:
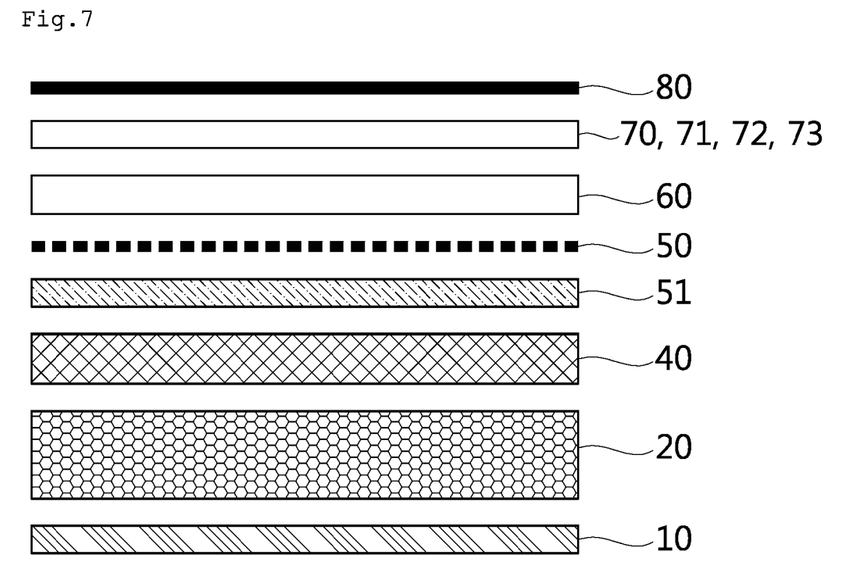
FIG. 7 is a mimetic cross-sectional view showing a seventh embodiment of the cushion flooring material according to the present invention.

FIG. 7 is an illustration showing a seventh embodiment of the cushion flooring material of the present invention, which has a laminated structure of a balance layer 10, a cushioning layer 20, a dimension-stabilizing layer 40, a colored layer 51, a print layer 50, a transparent layer 60, an elastic layer 70, 71, 72 or 73, and a surface treatment layer 80 in a sequential order from bottom, to top.

As for the cushion flooring material having such a layered structure, the layer thickness is preferably in the range of 0.1 to 0.2 mm for the balance layer 10; 0.3 to 3.0 ram (thickness before foaming) for the cushioning layer 20; 0.32 to 0.38 mm for the dimension-stabilizing layer 40; 0.1 to 0.2 mm for the colored layer 51; 0.1 to 0.7 mm for the transparent layer 60; 0.1 to 0.2 mm for the elastic layer 70, 71, 72 or 73; and 20 to 40 μm for the surface treatment layer 80.

In the above construction, the balance layer 10 and the transparent layer 60 can be omitted. But, when the transparent layer 60 is not used, it is preferable to have the elastic layer 70, 71, 72 or 73 thicker, in which case the thickness of the elastic layer 70, 71, 72 or 73 is in the range of 0.2 to 1.0 mm.

Figure 8:
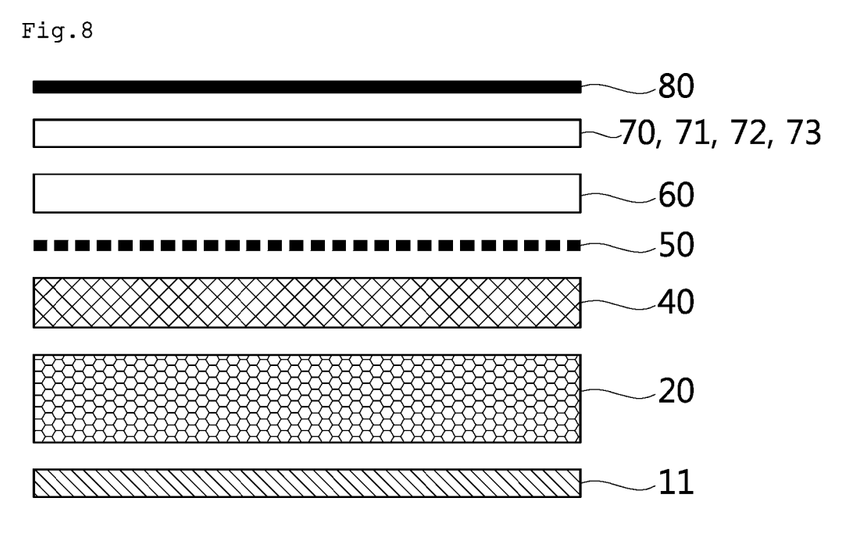
FIG. 8 is a mimetic cross-sectional view showing an eighth embodiment of the cushion flooring material according to the present invention.

FIG. 8 is an illustration showing an eighth embodiment of the cushion flooring material of the present invention, which has a laminated structure of an additional function layer 11, a cushioning layer 20, a dimension-stabilizing layer 40, a print layer 50, a transparent layer 60, an elastic layer 70, 71, 72 or 73, and a surface treatment layer 80 in a sequential order from bottom to top.

The eighth embodiment of the present invention is characterized by the non-foamed cushion flooring material with the cushioning layer 20 including neither a foaming agent nor a foam stabilizer.

In the flooring material of the eighth embodiment of the present invention, the cushioning layer 20 may also be prepared using a foaming agent and a foam stabilizer and thus foamed in the same manner of the cushioning layer according to other embodiments.

As for the cushion flooring material having such a layered structure, the layer thickness is preferably in the range of 0.1 to 0.2 mm for the additional function layer 11; 0.3 to 3.0 mm (thickness before foaming) for the cushioning layer 20; 0.32 to 0.38 mm for the dimension-stabilizing layer 40; 0.1 to 0.7 mm for the transparent layer 60; 0.1 to 0.2 mm for the elastic layer 70, 71, 72 or 73; and 20 to 40 µm for the surface treatment layer 80.

In the above construction, the additional function layer 11 and the transparent layer 60 can be omitted. But, when the transparent layer 60 is not used, it is preferable to have the elastic layer 70, 71, 72 or 73 thicker, in which case the thickness of the elastic layer 70, 71, 72 or 73 is in the range of 0.2 to 1.0 mm.

The present invention also provides a method for manufacturing a cushion flooring material, which includes a cushioning layer, a print layer, and an elastic layer in a sequential order from bottom to top, the method including: (a) preparing a cushioning layer; (b) foaming the cushioning layer; (c) printing a pattern on the cushioning layer or laminating a film or paper having a printed pattern to the cushioning layer to form a print, layer; (d) forming an elastic layer using a composition including a PHA resin; and (e) laminating the foamed cushioning layer, the print layer and the elastic layer together.

In the step of forming the elastic layer, the elastic layer may be formed from a resin composition including a PHA resin alone or a composite resin including a PHA resin (i.e., further including an acryl-based elastic resin and/or a PLA resin).

The manufacturing method for the cushion flooring material according to the present invention may further include: preparing a dimension-stabilizing layer 40 composed of glass fiber impregnated with a PVC sol. In this case, prior to the foaming step, a lining layer 30 may be provided on the cushioning layer 20 and laminated to the cushioning layer 20, in order to enhance the adhesion between the dimension-stabilizing layer 40 and the cushioning layer 20. Further, in the case that the dimension-stabilizing layer 40 is formed, a pattern is printed on the dimension-stabilizing layer 40 instead of the cushioning layer 20, or a film or paper with a printed pattern is laminated to the dimension-stabilizing layer 40 to form a print layer 50.

Further, prior to the foaming step, a balance layer 10 prepared from a resin composition including polyvinyl chloride and a filler is separately provided and then laminated to the cushioning layer 20 or the cushioning layer 20 and the lining layer 30.

Further, prior to the foaming step, an additional function layer 11 composed of woven fabric, knitted fabric or non-woven fabric is separately provided and then laminated to the cushioning layer 20.

Further, prior to the printing step, a colored layer 51 composed of a resin composition including polyvinyl chloride and a filler is separately provided, and then a pattern is printed on the colored layer 51 or a film or paper with a printed pattern is used to form a print layer 50.

Optionally, the colored layer 51 may be formed without the print layer 50.

Further, the laminating step may include providing a transparent layer 60 composed of a clear PVC film or a clear PET film and then laminating it between the print layer 50 and the elastic layer 70, 71, 72 or 73.

Further, the method may further include a surface treatment step after the laminating step, where the surface treatment step includes applying a coating of a photocurable composition onto the top of the elastic layer and then curing the photocurable composition by exposure to the ultraviolet light to form a surface treatment layer 80.

The specific composition and preparation of the individual layers are as specified above and will not be described any more.

Figure 9:
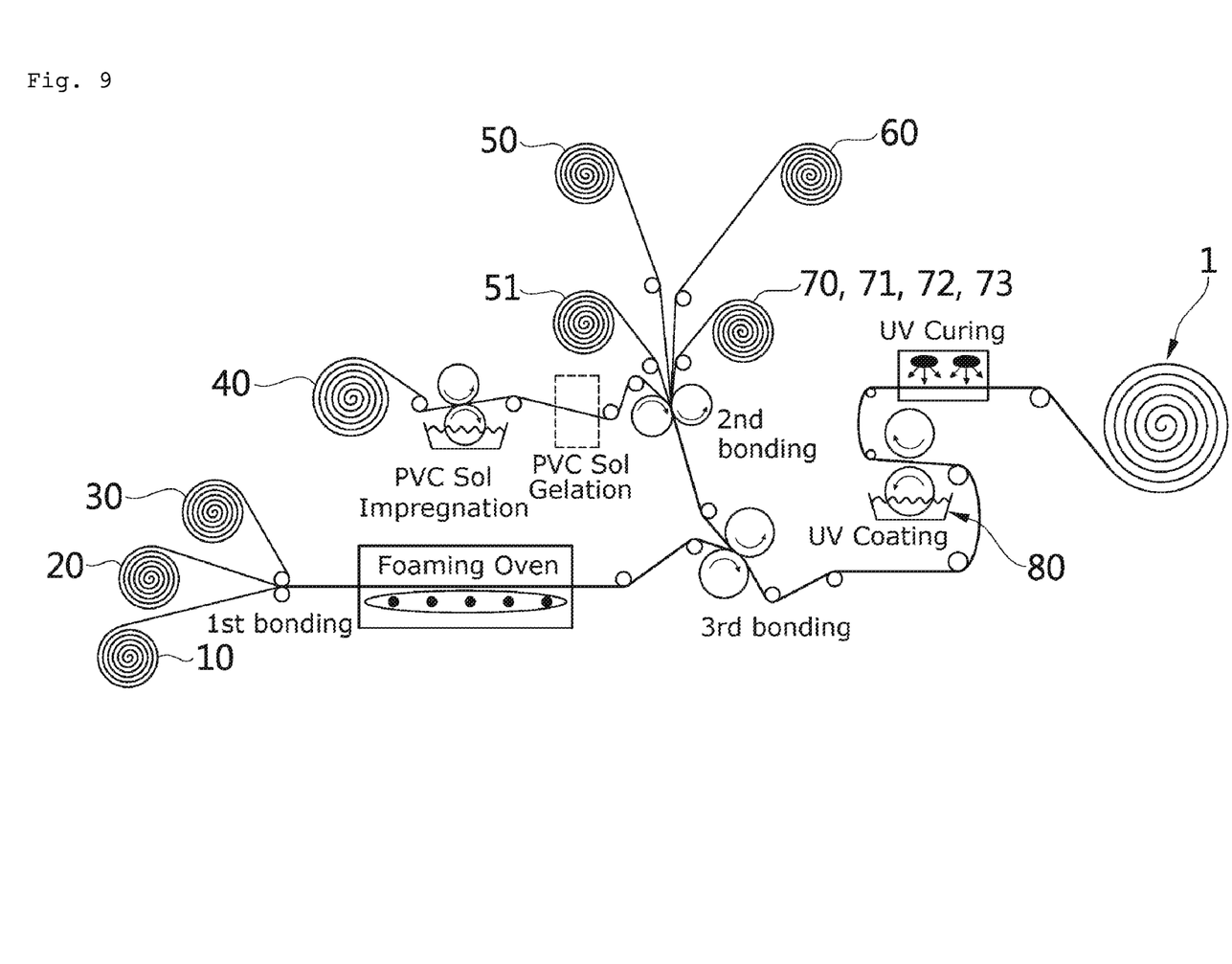
FIG. 9 is a mimetic diagram showing the process of manufacturing the cushion flooring material according to the present invention.

The method for manufacturing the cushion flooring material according to the present invention can be described in summary as follows (Refer to FIG. 9).

The individual layers constituting the cushion flooring material of the present invention other than the print layer 50 and the dimension-stabilizing layer 40 can be prepared through calendering molding, cast molding, blow molding, or extrusion molding.

The plural layers thus prepared, that is, the additional function layer 11 (optional), the balance layer 10 (optional), the cushioning layer 20, and the lining layer 30 (optional) in a sequential order from bottom to top are laminated together (in a first laminating step) and then subjected to a foam molding process in an oven.

In addition, the print layer 50 is formed using a general printing process, such as gravure, screen or transfer printing, to print a pattern on the dimension-stabilizing layer 40, which is prepared by impregnating a non-woven fabric of glass fiber with PVC sol and then gelling the PVC sol. The print layer 50 is also formed by laminating a film or paper having a printed pattern to the dimension-stabilizing layer 40. Unlike this, the colored layer 51 is first formed on the dimension-stabilizing layer 40 and then the print layer 50 is formed by printing a pattern on the colored layer 51 through the gravure, screen or transfer printing method or laminating a film or paper having a printed pattern to the colored layer 51. Optionally, the colored layer 51 is formed on the dimension-stabilizing layer 40, and the print layer 50 is not formed.

At the same time, the transparent layer 60, preferably a clear PVC or PET film is disposed on the print layer 50 or the colored layer 51. Then, the elastic layer 70, 71, 72 or 73 including the PHA resin is disposed on the transparent layer 60 or laminated directly to the print layer 50 or the colored layer 51 without the transparent layer 60 (in a second laminating step).

After the individual layers constituting the top and bottom parts of the flooring material are independently laminated together, the dimension-stabilizing layer 40 is put on the lining layer 30 and laminated to the lining layer 30 (in a third laminating step).

The individual layers laminated together are cooled down. Optionally, a coating liquid preferably containing a photocurable compound dissolved in a solvent is applied to the top surface of the elastic layer 70, 71, 72 or 73 using a coating machine and then cured by exposure to the ultraviolet light to form the surface treatment layer 80, thereby obtaining a cushion flooring layer as the final product.

Hereinafter, the present invention will be described with reference to the preferred examples, which are given for the understanding of the disclosure of the present invention and not intended to limit the scope of the present invention. It is apparent to those skilled in the art that various changes and modifications can be made within the spirit and scope of the present invention as hereinafter claimed.

EXAMPLES

Example 1

The balance layer 10, the cushioning layer 20, the lining layer 30, the dimension-stabilizing layer 40, the print layer 50, the transparent layer 60, the elastic layer 72, and the surface treatment layer 80 are laminated in the sequential order from, bottom to top to manufacture a cushion flooring material 1 according to the present invention having a total thickness of 4.5 mm, wherein the transparent layer 60 uses a clear PVC film, and the elastic layer 72 is prepared in a thickness of 0.2 mm by mixing a composite resin composed, of 30 wt % of a PHA resin, 30 wt % of an acryl-based elastic resin, and 40 wt. % of a PLA resin, 1 part by weight of a lubricant with respect to 100 parts by weight of the composite resin, and other additives. The PHA resin is a polymer including 80 wt % of poly(3-hydroxybutyrate) (P(3HB)) and 20 wt % of poly(4-hydroxybutyrate) (P(4HB)).

Comparative Example 1

The procedures are performed to obtain a flooring material in the same manner as described in Example 1, excepting that the transparent layer 60 is used without the elastic layer 72.

Experimental Example

The flooring material of Example 1 and the flooring material (Comparative Example 1) using the transparent layer 60 as a surface layer are measured in regards to the total volatile organic compound (TVOC) emission. The measurement results are presented in Table 1.

The TVOC emission measurement is carried out according to the indoor air quality standards method—small chamber (Notification No, 2010-24 of the Ministry of Environment in South Korea), which includes adding a species of the flooring material into a 20 L small chamber connected to a mass spectrometer/high performance liquid chromatography (MS/HPLC), capturing the TVOC emitted from the species into the small chamber and measuring the TVOC in air introduced to the mass spectrometer/high performance liquid chromatography (MS/HPLC) directly from the small chamber. As for other test conditions, which are the conditions of the flooring material in the real living environment, the temperature is the room temperature (about 25° C.) and the species of Example 1 and Comparative Example 1 are tested at the same temperature for the same period of time to compare the TVOC emissions measured under the objectively same conditions.

TABLE 1

| Div. | TVOC (mg/m³ · h) | Measurement method |
|---|---|---|
| Comparative Example 1 | 0.376 | Indoor air quality standards methods - small chamber |
| Example 1 | 0.057 | |

As can be seen from Table 1, the cushion flooring material of the present invention (Example 1) has the lower TVOC emission than the flooring material including no elastic layer (Comparative Example 1).

Experimental Example 2

The results of the sound insulation test for Example 1 and Comparative Example 1 are presented in Table 2. The sound insulation test is carried out according to the KS F 2810-1 (Light, impact noise test standards). The control is the bare floor with no flooring material, the "Comparative Example 1" is the flooring material of Comparative Example 1 placed on the bare floor, and the "Example 1" is the flooring material of Example 1 on the bare floor.

TABLE 2

| | Sound insulation performance | | Measurement |
|---|---|---|---|
| Div. | Measurement | Decrement | method |
| Control | 78 | — | KS F 2810-2 (light impact noise) |
| Comparative Example 1 | 62 | Δ16 | |
| Example 1 | 63 | Δ25 | |

As can be seen from Table 2, the cushion flooring material of the present invention can enhance the sound insulation relative to the flooring material of Comparative Example 1.

EXPLANATION OF ESSENTIAL REFERENCE NUMERALS IN DRAWINGS

1: Cushion flooring material
10: Balance layer
11: Additional function layer
20: Cushioning layer
30: Lining layer
40: Dimension-stabilizing layer
50: Print layer
51: Colored layer
60: Transparent layer
70, 71, 72, 73: Elastic layer
80: Surface treatment layer

What is claimed is:
1. A cushion flooring material comprising:
a cushioning layer, a print layer, and an elastic layer in a sequential order from bottom to top,
wherein the elastic layer comprises a polyhydroxyalkanoate (PHA) resin,
wherein the polyhydroxyalkanote (PHA) resin is a copolymer of 50 to 99 wt % of hard segments and 1 to 50 wt % of soft segments, and
wherein the hard segment includes a repeating unit of poly(3-hydroxybutyrate) (P(3HB)), and the soft segment includes a repeating unit of poly(4-hydroxybutyrate) (P(4HB)).

2. A cushion flooring material comprising:
a cushioning layer, a print layer, and an elastic layer in a sequential order from bottom to top,
wherein the elastic layer comprises a composite resin comprising a polyhydroxyalkanote (PHA) resin and an acryl-based elastic resin,
wherein the polyhydroxyalkanote (PHA) resin is a copolymer of 50 to 99 wt % of hard segments and 1 to 50 wt % of soft segments,
wherein the hard segment includes a repeating unit of poly(3-hydroxybutyrate) (P(3HB)) and the soft segment includes a repeating unit of poly(4-hydroxybutyrate) (P(4HB)), and
wherein the elastic layer comprises 30 to 70 wt % of the polyhydroxyalkanote (PHA) resin and 30 to 70 wt % of the acryl-based elastic resin.

3. A cushion flooring material comprising:
a cushioning layer, a print layer, and an elastic layer in a sequential order from bottom to top,
wherein the elastic layer comprises a composite resin comprising a polyhydroxyalkanote (PHA) resin, an acryl-based elastic resin, and a polylactic acid (PLA) resin,
wherein the polyhydroxyalkanote (PHA) resin is a copolymer of 50 to 99 wt % of hard segments and 1 to 50 wt % of soft segments,
wherein the hard segment includes a repeating unit of poly(3-hydroxybutyrate) (P(3HB)) and the soft segment includes a repeating unit of poly(4-hydroxybutyrate) (P(4HB)), and
wherein the elastic layer comprises 10 to 50 wt % of the polyhydroxyalkanote (PHA) resin, 20 to 80 wt % of the acryl-based elastic resin, and 10 to 50 wt % of the polylactic acid (PLA) resin.

4. A cushion flooring material comprising:
a cushioning layer, a print layer, and an elastic layer in a sequential order from bottom to top,
wherein the elastic layer comprises a composite resin comprising a polyhydroxyalkanote (PHA) resin and a polylactic acid (PLA) resin,
wherein the polyhydroxyalkanote (PHA) resin is a copolymer of 50 to 99 wt % of hard segments and 1 to 50 wt % of soft segments, and
wherein the hard segment includes a repeating unit of poly(3-hydroxybutyrate) (P(3HB)), and the soft segment includes a repeating unit of poly(4-hydroxybutyrate) (P(4HB)).

5. The cushion flooring material as claimed in claim 2, wherein the acryl-based elastic resin is a copolymer of a polymer of an alkylmethacrylate monomer constituting a hard segment and a polymer of an alkylacrylate monomer constituting a soft segment.

6. The cushion flooring material as claimed in claim 5, wherein the copolymer is a core-shell copolymer or a block copolymer.

7. The cushion flooring material as claimed in claim 5, wherein the alkylmethacrylate monomer is methylmethacrylate.

8. The cushion flooring material as claimed in claim 5, wherein the alkylacrylate monomer is n-butylacrylate.

9. The cushion flooring material as claimed in claim 4, wherein the elastic layer comprises 10 to 90 wt % of the polyhydroxyalkanote (PHA) resin and 10 to 90 wt % of the polylactic acid (PLA) resin.

10. The cushion flooring material as claimed in claim 1, wherein the cushion flooring material further comprises a transparent layer formed between the print layer and the elastic layer, wherein the transparent layer is a transparent polyvinyl chloride (PVC) film or a transparent polyethylene terephthalate (PET) film.

11. The cushion flooring material as claimed in claim 1, wherein the cushion flooring material further comprises a dimension-stabilizing layer formed between the cushioning layer and the print layer, wherein the dimension-stabilizing layer is glass fiber impregnated with a polyvinyl chloride (PVC) sol.

12. The cushion flooring material as claimed in claim 11, wherein the cushion flooring material further comprises a lining layer formed between the cushioning layer and the dimension-stabilizing layer to promote adhesion.

13. The cushion flooring material as claimed in claim 1, wherein the cushion flooring material further comprises an additional function layer or a balance layer formed under the cushioning layer, wherein the balance layer comprises polyvinyl chloride and a filler.

* * * * *